United States Patent
Bender

(10) Patent No.: US 10,920,883 B2
(45) Date of Patent: Feb. 16, 2021

(54) VEHICLE TRANSMISSION

(71) Applicant: DAIMLER AG, Stuttgart (DE)

(72) Inventor: Helmut Bender, Pleidelsheim (DE)

(73) Assignee: DAIMLER AG, Stuttgart (DE)

( * ) Notice: Subject to any disclaimer, the term of this patent is extended or adjusted under 35 U.S.C. 154(b) by 301 days.

(21) Appl. No.: 15/761,605

(22) PCT Filed: Jun. 29, 2016

(86) PCT No.: PCT/EP2016/001105
§ 371 (c)(1),
(2) Date: Mar. 20, 2018

(87) PCT Pub. No.: WO2017/050401
PCT Pub. Date: Mar. 30, 2017

(65) Prior Publication Data
US 2018/0347694 A1    Dec. 6, 2018

(30) Foreign Application Priority Data
Sep. 22, 2015  (DE) .......................... 10 2015 012 348

(51) Int. Cl.
*F16H 63/32*    (2006.01)
(52) U.S. Cl.
CPC .................................... *F16H 63/32* (2013.01)
(58) Field of Classification Search
CPC ............... F16H 63/32; F16H 2063/321; F16H 2063/322; F16H 2063/324; F16H 2063/325; F16H 2063/327; F16H 2063/328
(Continued)

(56) References Cited

U.S. PATENT DOCUMENTS 5,027,672 A * 7/1991 Salvatori ................. F16H 63/32
192/82 R
5,893,293 A * 4/1999 Earp ..................... F16H 63/206
74/335

(Continued)

FOREIGN PATENT DOCUMENTS

| CN | 1244636 A | 2/2000 |
| DE | 1122385 B | 1/1962 |

(Continued)

OTHER PUBLICATIONS

International Search Report dated Sep. 13, 2016 in related International Application No. PCT/EP2016/001105.

(Continued)

*Primary Examiner* — Jake Cook
*Assistant Examiner* — Gregory Robert Weber
(74) *Attorney, Agent, or Firm* — Patent Portfolio Builders PLLC

(57) ABSTRACT

A vehicle transmission includes a toothed gear, a shift sleeve, a shift fork configured to actuate the shift sleeve, and a fork bend partially surrounding the shift sleeve in an installed state. At least one region of the fork bend has an axial step. The at least one region having the axial step has a shape of a circular ring section substantially extending at an angle of 180 degrees in a circumferential direction of the fork bend. The axial step has two radially adjacent sections arranged axially offset in relation to one another. One section of the fork bend partially engages in the toothed gear in an initial switching state and a second section of the fork bend overlaps with one side wall of a groove in the shift sleeve in an axial direction.

11 Claims, 6 Drawing Sheets

Figure 1:
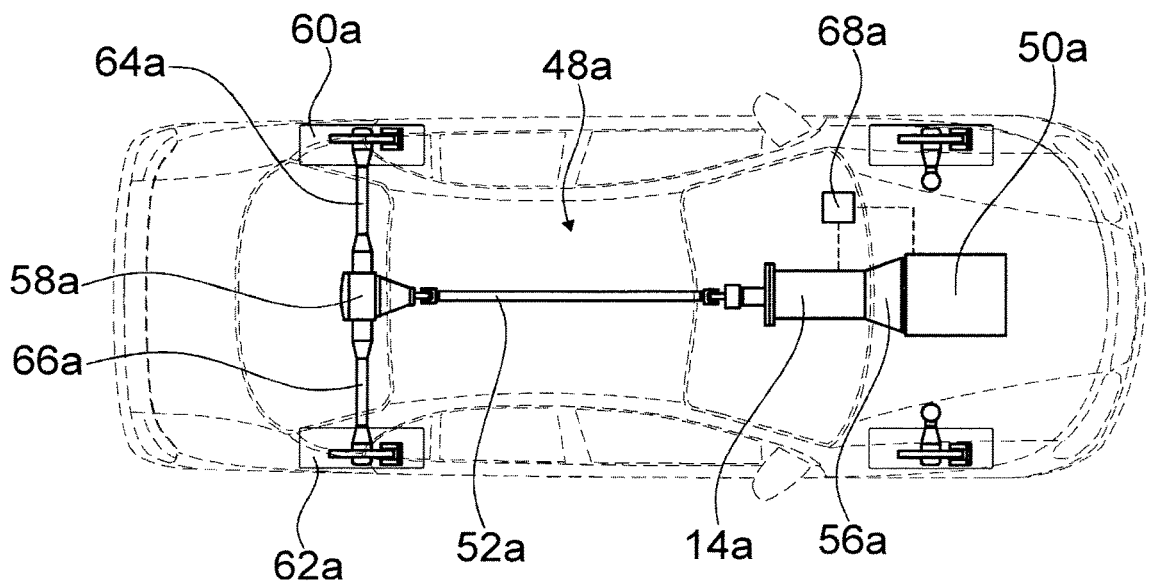

(58) Field of Classification Search
USPC ....................................................... 74/473.36
See application file for complete search history.

(56) References Cited

U.S. PATENT DOCUMENTS

| | | | | |
|---|---|---|---|---|
| 6,038,938 A * | 3/2000 | Szczepanski | ........... | F16H 63/20 |
| | | | | 29/527.6 |
| 6,164,151 A * | 12/2000 | Dutson | ................... | F16H 63/32 |
| | | | | 192/82 R |
| 6,173,624 B1 * | 1/2001 | Decker | ................... | F16H 63/18 |
| | | | | 475/269 |
| 7,757,578 B2 * | 7/2010 | Shintani | ................ | F16H 61/688 |
| | | | | 74/337.5 |
| 9,383,008 B2 * | 7/2016 | Anderson | ................ | F16H 63/32 |
| 9,644,736 B2 * | 5/2017 | Senda | ....................... | F01M 1/02 |
| 10,234,033 B2 * | 3/2019 | Narita | ..................... | F16H 63/32 |
| 2010/0126294 A1 * | 5/2010 | Shintani | ................ | F16H 61/688 |
| | | | | 74/473.36 |

FOREIGN PATENT DOCUMENTS

| | | | |
|---|---|---|---|
| DE | 102007009120 A1 | 8/2008 | |
| JP | S57220 U | 1/1982 | |
| JP | S57166621 A | 10/1982 | |

OTHER PUBLICATIONS

Written Opinion dated Sep. 13, 2016 in related International Application No. PCT/EP2016/001105.

* cited by examiner

VEHICLE TRANSMISSION

BACKGROUND AND SUMMARY OF THE INVENTION

Exemplary embodiments of invention relate to a vehicle transmission with a toothed gear, a shift sleeve, and a shift fork.

A shift fork for the actuation of a shift sleeve in a vehicle transmission, with a fork bend that at least partially surrounds the shift sleeve in an installed state, is already known.

German patent document DE 11 22 385 B discloses a shift fork with a fork bend that has an axial step in the circumferential direction. DE 10 2007 009 120 A1 discloses a shift fork with a fork bend that has an axial step in the radial direction.

Exemplary embodiments of the invention are directed to using an available installation space in a highly advantageous way.

The basis of the invention is a vehicle transmission with a shift fork for actuation of a shift sleeve with a fork bend that at least partially surrounds the shift sleeve in an installed condition.

At the same time, the fork bend has an axial step, at least one region. This allows available installation space to be used in a particularly advantageous way. A particularly compact shift fork can be provided. A particularly robust shift fork can be provided.

In accordance with an embodiment of the invention, the region of the step be designed in the shape of a circular ring section, which substantially extends at an angle of 180 degrees in the circumferential direction of the fork bend, wherein two radially adjacent sections are arranged as axially offset in relation to one another, and wherein one section of the fork bend partially engages in the toothed gear in an initial switching state, and a second section of the fork bend overlaps with one side wall of a groove in the shift sleeve in the axial direction.

"Shift fork" in this context is understood specifically to be a device that is intended to transfer an at least substantially translatory switching movement on to the shift sleeve in one direction of displacement. Specifically, the shift fork has at least one guide element, for example a guide tube, guide ring, guide strip, guide groove and/or another element deemed suitable by experts, that is intended to guide the shift fork in the direction of displacement. Specifically, the shift sleeve has a rotational axis that is at least substantially arranged in parallel to the direction of displacement. The term "shift fork" specifically refers in this case to an element that has at least two fork ends that are intended to at least partially engage in the shift sleeve in an installed state. Preferably, the fork bend is designed as disk-shaped. Preferentially, the fork bend is at least substantially designed as a circular ring section. Preferably, the fork bend has an axis that is arranged in a center of a circle that corresponds to the circular ring section and that is at least substantially perpendicular in relation to a disk plane of the fork bend. Preferentially, the axis of the fork bend is arranged parallel to the rotational axis of the shift sleeve. Preferably, the axis of the fork bend coincides with the rotational axis of the shift sleeve. Directional terms such as "axial", "radial" and "in the circumferential direction" should be specifically understood in relation to the direction of displacement and/or the axis of the fork bend. "Axial" direction should be understood in this context specifically as the direction of the axis of the fork bend and/or the direction of displacement. A "radial" direction should be understood in this context specifically as a direction that is oriented perpendicular relative to the axis of the fork bend and/or the direction of displacement and that intersects the axis of the fork bend and/or the rotational axis of the shift sleeve. A "circumferential direction" should be understood in this context specifically as a direction that is perpendicular in relation to the axial direction and perpendicular in relation to the radial direction. That the fork bend "partially surrounds" the shift sleeve should specifically be understood in this context to mean that the fork bend has an inner circumference that at least partially extends along an outer circumference of the shift sleeve. Preferably, the contour of the inner circumference corresponds at least sectionally to the contour of the outer circumference of the shift sleeve. Preferably, the fork bend has an edge along an inner circumference, where the edge engages in the shift sleeve in an installed state. Preferably, the fork bend is intended to at least substantially engage in the shift sleeve in the radial direction. Preferentially, the region of the step is to be designed in an arched shape. Preferably, the region of the step is designed in the shape of a circular ring section. It is conceivable for the fork bend to have an axial step in at least in one additional region and for the regions to be arranged offset to one another in a circumferential direction. "Axial step" in this context should specifically be understood as a transition between two radially adjacent sections that are axially offset in relation to one another. Preferentially, the fork bend has at least one axial sectional profile that has at least two aligned contours in the region of the step that are predominantly S-shaped. An "axial sectional profile" in this context should specifically be understood as a sectional profile that arises by means of a section along a sectional plane that encloses the axis of the fork bend and/or the rotational axis of the shift sleeve. Specifically, the sectional plane is arranged parallel to the direction of displacement of the shift fork. Specifically, the sectional plane is arranged perpendicular in relation to the circumferential direction. Preferentially, the sectional plane encloses any angle with an axial plane of symmetry of the shift fork. Preferentially, the sectional profile is delimited by the S-shaped contours in the region of the step. "Intended" should specifically be understood as specially designed and/or equipped. That an object is intended for a specific function specially means that the object fulfills and/or performs this specific function, at least in a state of use and/or operation state.

In addition, the fork bend can have at least one axial sectional profile with at least two S-shaped contours that are at least substantially arranged in parallel with one another. As a result, a particularly high rigidity level can be achieved in the fork bend. "S-shaped contour" in this context should specifically be understood as a contour, the path of which has two opposing directional changes, specifically bends or corners. Preferentially, the directional changes have an identical magnitude. Preferentially, the fork bend has a thickness that is at least substantially constant in the region of the step. A "thickness" of the fork bend should be specifically understood in this context as an axial material thickness.

In an advantageous embodiment, the fork bend has at least two bend planes that are in each case perpendicular in relation to a direction of displacement of the fork bend and arranged axially offset in relation to one another. As a result, the installation space required for the shift fork can be further reduced. "Bend plane" in this context is to be understood specifically as a plane in which at least one section of the fork bend extends. Preferentially, the bend plane is designed as a central plane of the section. Preferentially, the section has a circumferential extension angle of at least 60 degrees, preferably at least 120 degrees and particularly preferably at least 170 degrees. Preferentially, the fork bend has at least an axial sectional profile with a central axis that runs substantially in the radial direction and that runs radially under the step and radially above the step, at least substantially perpendicular to the direction of displacement of the fork bend. The statement that a point and/or region is arranged "radially below" a reference point and/or a reference region, should in this context specifically be understood as meaning that the point and/or region is at a smaller distance from a reference axis than the reference point and/or reference region. The statement that a point and/or region is arranged "radially above" a reference point and/or a reference region, should in this context specifically be understood as meaning that the point and/or region is at a larger distance from a reference axis than the reference point and/or the reference region.

Advantageously, the shift fork has at least one engaging element arranged in this region that is intended to interact with the shift sleeve. As a result, particularly minimal friction can be achieved between the shift fork and the shift sleeve. A particularly efficient vehicle transmission can be provided. An axial position of the engaging element can be configured as particularly flexible, which can allow for a particularly compact vehicle transmission. The engaging element specifically has at least one contact surface that is intended for making contact with the shift sleeve and is aligned at least substantially perpendicular to the direction of displacement. It is conceivable that the switch fork could have only a single engaging element that would preferably, at least substantially, run across an entire inner circumference of the fork bend. Preferably, the shift fork has at least one additional engaging element in the region and the engaging elements are arranged offset from one another in the circumferential direction. It is conceivable that at least one engaging element is integral with the fork bend.

In addition, the fork bend can have a maximum thickness in the region of the step, and the step can have a step height that is greater than 50% of the maximum axial thickness. As a result, a particularly high rigidity level can be achieved in the fork bend in a particularly simple way. The axial position of engaging elements can be established particularly flexibly. "Step height" in this context is specifically to be understood as an axial staggering of two sections that are arranged on different sides of the step. Preferentially, the step height is greater than 60%, preferably 70% of the maximum thickness of the fork bend in the region of the step. Preferentially, the step height is smaller than 90%, preferably 80% of a minimum thickness of the fork bend in the region of the step.

In a preferred embodiment, the region of the step extends in a circumferential direction at least 60 degrees. As a result, the resilience of the shift fork can be increased. Preferentially, the region of the step has a circumferential extension of 120 degrees, preferably at least 150 degrees and particularly preferably at least 170 degrees.

In addition, the fork bend can have a maximum thickness in the region of the step, and the step can have a radial extension that is smaller than double the minimum thickness. As a result, fork bend rigidity is further increased. Preferentially, the radial extension is less than 1.5 times, but preferably less than 1.25 times, and particularly preferably less than 1.0 times the minimum thickness. Preferentially, the step has a radial distance from an inner circumference of the fork bend that is smaller than 30 mm, preferably smaller than 25 mm and particularly preferably smaller than 20 mm.

In an advantageous embodiment, the fork bend is designed at least partially press joined, drawn, forged or cast, at least in the region of the step. As a result, a particularly cost-efficient manufacturing process can be achieved. A shape of the shift fork can be adapted in a particularly advantageous way to the geometry of additional elements of the vehicle transmission. It is conceivable that the fork bend be designed with multiple parts, and more specifically with two parts, and for it to have elements that are, for example, connected to one another in the region of the step. It is conceivable for the fork bend to comprise a basic body and multiple engaging bends on which at least one engaging element is arranged, and that are arranged offset in relation to one another in a circumferential direction on the basic body, and that are preferably securely connected to the basic body.

In addition, the fork bend can have an axial step in at least one additional region. As a result, the fork bend can be adapted to the available installation space in a way that is particularly flexible. Preferentially, the additional region is designed in an arched shape. Preferentially, the additional region is at least substantially designed in the shape of a circular ring section. Preferentially, the additional region is arranged at least substantially concentric to the region of the first step. Preferably, the steps are arranged radially spaced apart from each other. It is conceivable for the fork bend to have at least a third axial step in at least a third additional region. It is conceivable for the steps to be in a common axial direction. It is conceivable for the steps to be in opposing axial directions. It is conceivable, in an alternative embodiment, for the fork bend to have a collar that extends out in the axial direction across a disk plane of the fork bend and then extends in the circumferential direction. As a result, a rigidity of the shift fork can be further increased.

In addition, a vehicle transmission with at least one shift fork according to the invention is disclosed. As a result, a particularly compact vehicle transmission can be provided. A particularly reliable vehicle transmission can be provided. It is possible to achieve minimal maintenance and/or repair costs.

Additional advantages are found in the following description of the figures. The figures have six exemplary embodiments of the invention. The figures, the figure description and the claims contain a large number of combined features. A person skilled in the art will also assess these features individually and combine them into practical additional combinations.

BRIEF DESCRIPTION OF THE DRAWING FIGURES

Figure 2:
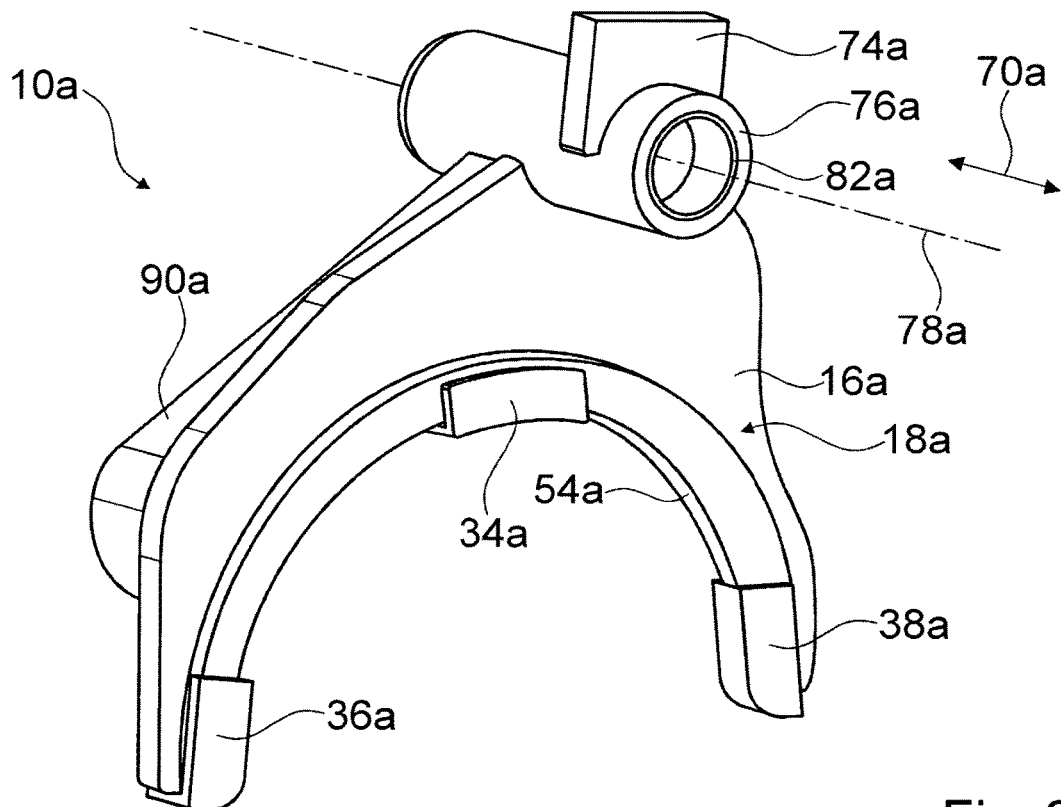
Figure 3:
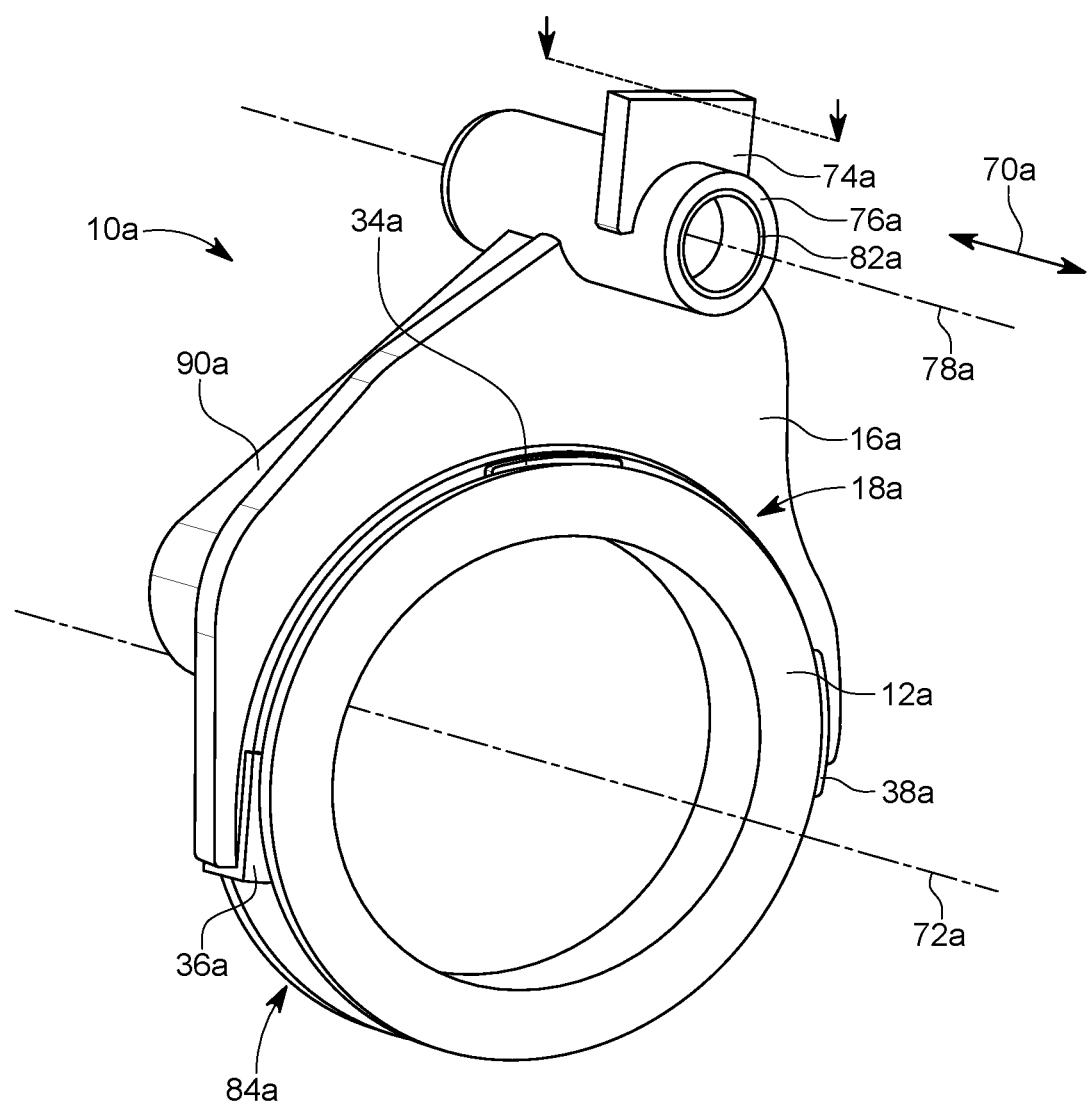
Figure 4:
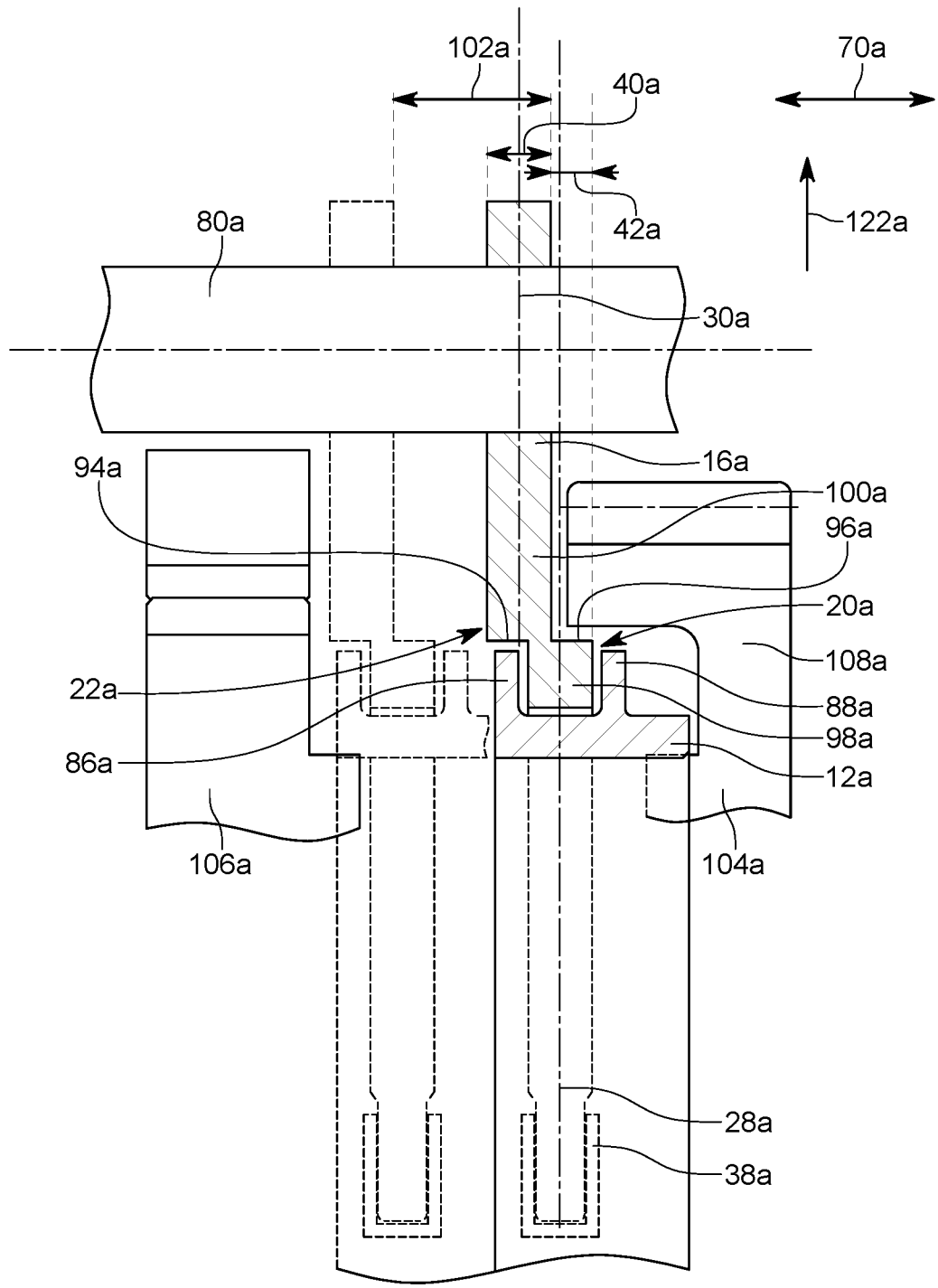
Figure 5:
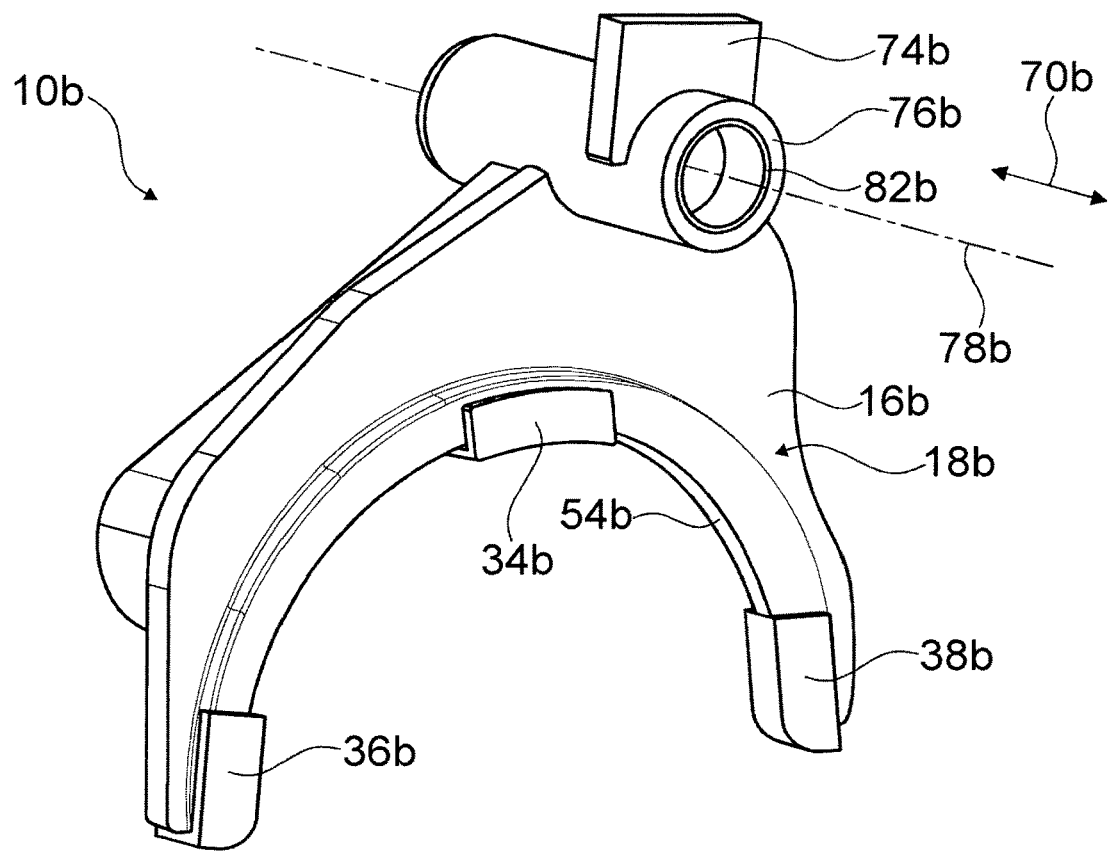
Figure 6:
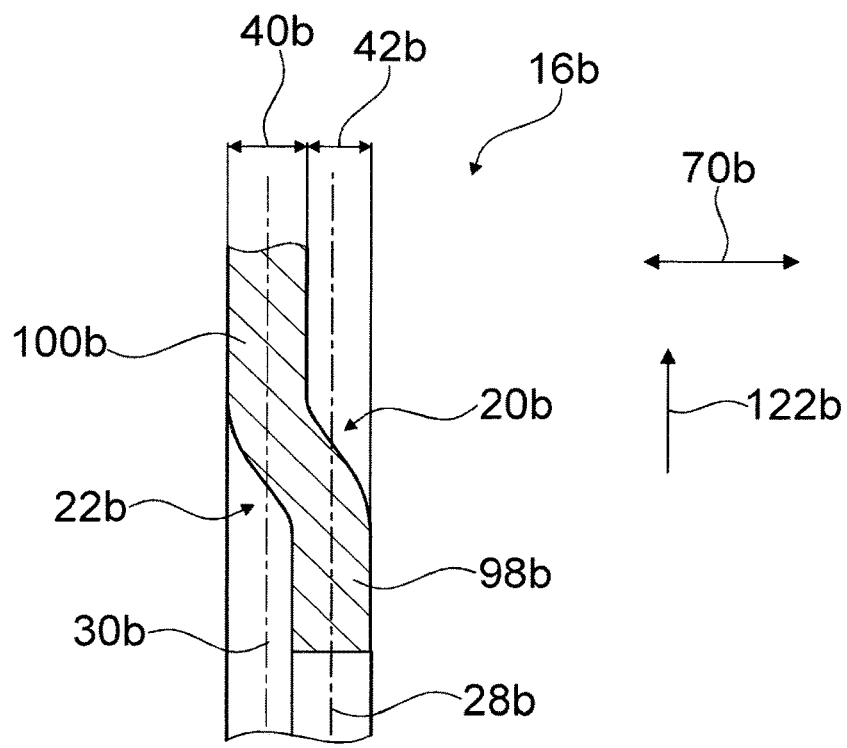
Figure 7:
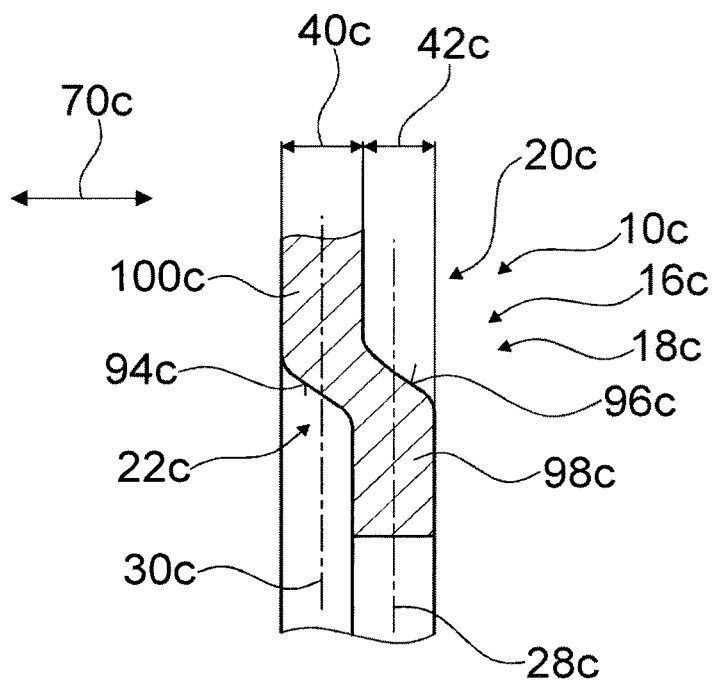
Figure 8:
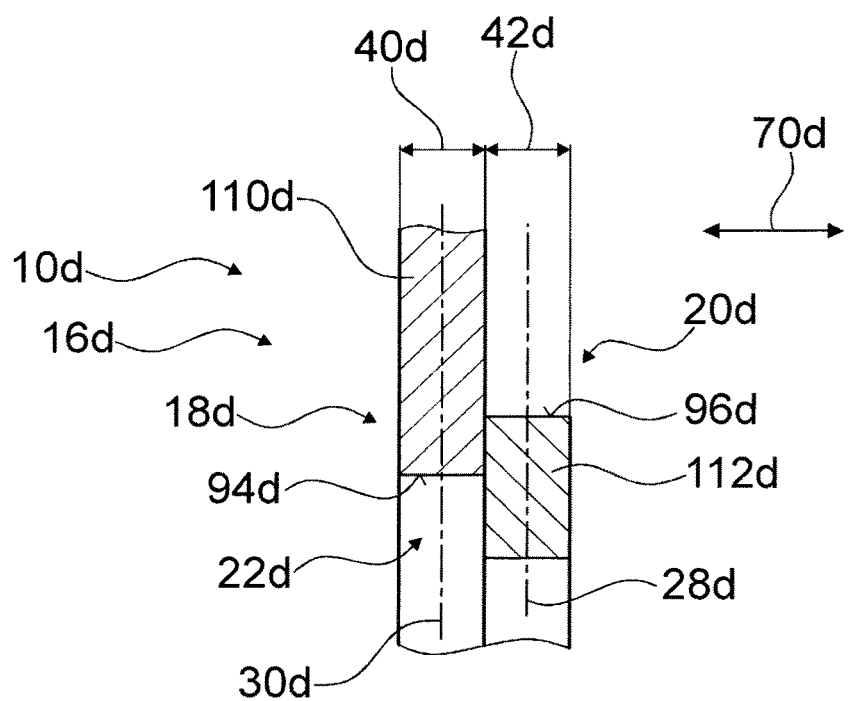
Figure 9:
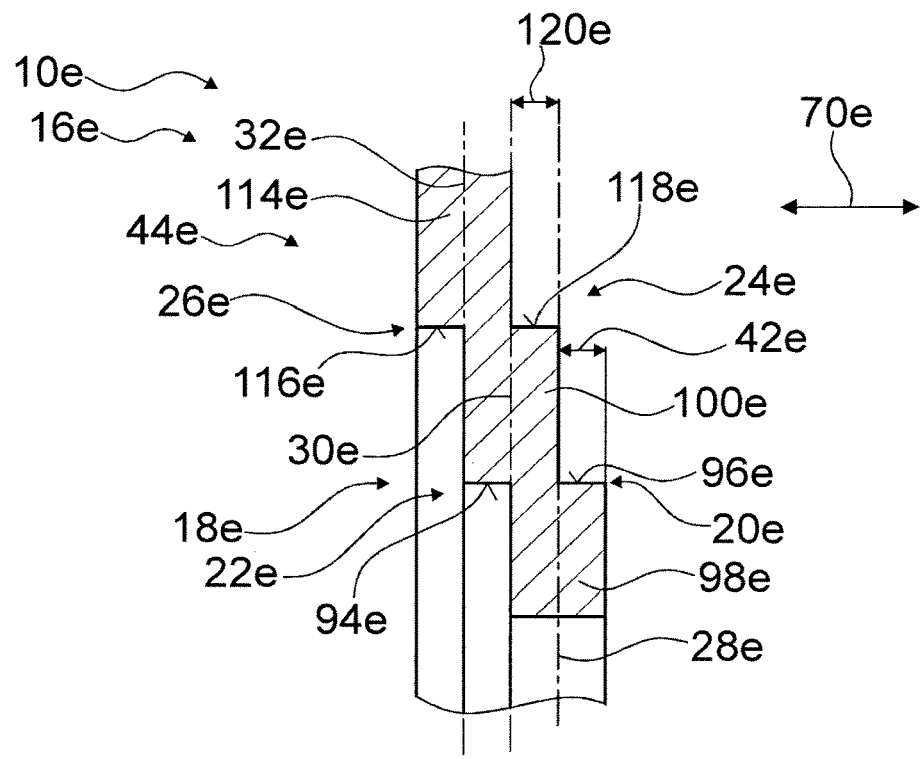
Figure 10:
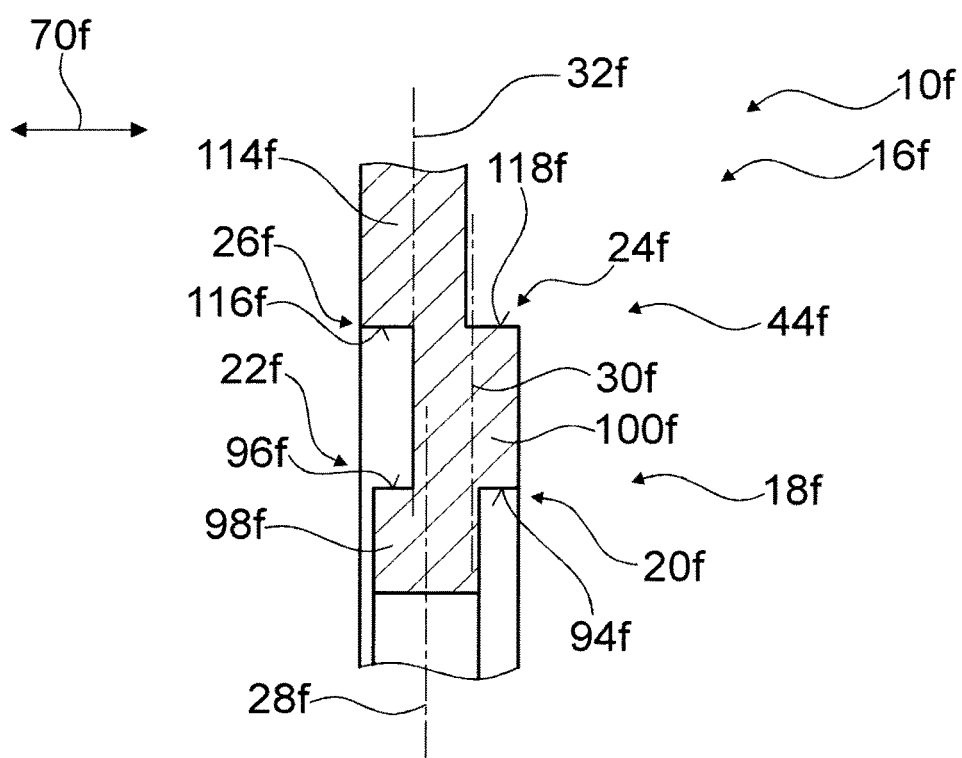

The following figures show the following:

FIG. 1 a schematic overview of a vehicle power train with a vehicle transmission, FIG. 2 a perspective view of a shift fork of the vehicle transmission, FIG. 3 a perspective view of the shift fork and a shift sleeve, FIG. 4 a partial section view of the shift fork and shift sleeve in two shift positions, FIG. 5 a perspective view of a shift fork of an additional exemplary embodiment with an elongated fork bend, FIG. 6 a sectional view of the fork bend, FIG. 7 a sectional view of an exemplary embodiment of a shift fork with a forged fork bend, FIG. 8 a sectional view of an exemplary embodiment of a shift fork with a two-piece fork bend, FIG. 9 a sectional view of an exemplary embodiment of a shift fork with a fork bend that is multi-stepped in a common direction and FIG. 10 a sectional view of an exemplary embodiment of a shift fork with a fork bend that is multi-stepped in opposing directions.

DETAILED DESCRIPTION

FIG. 1 shows power train 48a of a motor vehicle. Power train 48a comprises an internal combustion engine 50a and vehicle transmission 14a, along with coupling device 56a. Power train 48a also comprises differential 58a and two drive gears 60a, 62a, in addition to propshaft 52a, which is arranged between vehicle transmission 14a and differential 58a, as well as the two additional propshafts 64a and 66a, that are arranged between differential 58a and one of drive gears 60a or 62a. Coupling device 56a is intended to separate vehicle transmission 14a, at least intermittently, from internal combustion engine 50a in terms of drive. Vehicle transmission 14a is intended to translate a speed of internal combustion engine 50a into a speed of drive shaft 52a. Vehicle transmission 14a has a plurality of gears, which each have different gear ratios. The motor vehicle has control and/or regulation unit 68a that is intended for the control and/or regulation of internal combustion engine 50a and vehicle transmission 14a.

FIG. 2 shows shift fork 10a for the actuation of shift sleeve 12a in vehicle transmission 14a, with fork bend 16a, which at least partially surrounds shift sleeve 12a in an installed state. Shift fork 10a is designed as a component of vehicle transmission 14a. Fork bend 16a surrounds shift sleeve 12a with reference to an outer circumference of shift sleeve 12a in an angular range of at least substantially 180 degrees. Fork bend 16a has inner circumference 54a, which faces shift sleeve 12a in an installed state. Fork bend 16a has an edge along inner circumference 54a, which engages in shift sleeve 12a in an installed state. Shift fork 10a has direction of displacement 70a in which shift sleeve 12a is shifted during a shift operation. As illustrated in FIG. 3, shift sleeve 12a has rotational axis 72a, which is arranged parallel to direction of displacement 70a of shift fork 10a. Shift fork 10a has driver 74a, which is intended to guide the shifting force for a shift operation into shift fork 10a. Shift fork 10a has guide tube 76a with axis 78a, which is arranged parallel to direction of displacement 70a. Guide tube 76a is intended for guiding shift fork 10a on guide bar 80a of vehicle transmission 14a in an axial direction. Shift fork 10a has guide sleeve 82a, which is inserted into guide tube 76a in an installed state. Guide sleeve 82a is designed as a sliding sleeve. Driver 74a and guide tube 76a are rigidly connected to one another. Driver 74a and guide tube 76a are, for example, integrally connected to one another. Driver 74a is designed in a disk shape. Driver 74a has a disk plane arranged perpendicular to direction of displacement 70a. Driver 74a is designed fork-shaped and has a semicircular fork opening. In an installed state, guide tube 76a is inserted into the fork opening of driver 74a. Driver 74a surrounds guide tube 76a. Alternatively, driver 74a can have a circular opening intended to receive guide tube 76a, where guide tube 76a penetrates driver 74a in an installed state. It is conceivable for driver 74a to be designed integrally with fork bend 16a.

Fork bend 16a is intended for moving shift sleeve 12a in direction of displacement 70a during a shift operation. Fork bend 16a is intended to transfer a shifting force from guide tube 76a to shift sleeve 12a. Fork bend 16a is rigidly connected to guide tube 76a. Fork bend 16a is, for example, integrally connected to guide tube 76a. Fork bend 16a is designed in a disk shape. Fork bend 16a has a thickness corresponding to an axial material thickness of fork bend 16a. Fork bend 16a has a disk plane. The disk plane is arranged perpendicularly in relation to direction of displacement 70a. The disk plane is arranged perpendicularly in relation to axis 78a of guide tube 76a. Shift fork 10a has supporting elements 90a, one of which is shown in FIG. 2. Supporting elements 90a are designed in strips. Supporting elements 90a substantially run in the circumferential direction. One strip plane of supporting elements 90a, 92a is in each case at least substantially arranged perpendicular to the disk plane of fork bend 16a. Supporting elements 90a, 92a are rigidly connected to fork bend 16a and shift fork 10a.

Fork bend 16a has an axial step in one region 18a. Region 18a is designed in an arch shape. Region 18a is designed in the shape of a circular ring section. Region 18a at least partially surrounds shift sleeve 12a in an installed state. Region 18a extends at least substantially at an angle of 180 degrees along entire inner circumference 54a of fork bend 16a. Region 18a has an extension in a circumferential direction of at least substantially 180 degrees. An extension of region 18a corresponds to an extension of fork bend 16a in the circumferential direction. Shift fork 10a has three engaging elements 34a, 36a, 38a arranged in region 18a that are intended to interact with shift sleeve 12a. Region 18a is arranged beside inner circumference 54a of fork bend 16a. First engaging element 34a is arranged with reference to a circumferential direction in the center of inner circumference 54a of fork bend 16a. Two additional engaging elements 36a, 38a are arranged on one end of fork bend 16a on inner circumference 54a of fork bend 16a. Engaging elements 34a, 36a, 38a are made of polyamide. It is conceivable that engaging elements 34a, 36a, 38a be made of another material that appears suitable to a person skilled in the art, for example another type of plastic or metal. Engaging elements 34a, 36a, 38a are rigidly connected to fork bend 16a. Engaging elements 34a, 36a, 38a are molded onto fork bend 16a.

Engaging elements 34a, 36a, 38a are intended to transfer shifting force for a shift operation onto shift sleeve 12a. Engaging elements 34a, 36a, 38a are intended to make contact with shift sleeve 12a during a shift operation. On an outer circumference, shift sleeve 12a has groove 84a, in which engaging elements 34a, 36a, 38a engage in an installed state (see FIG. 3). Groove 84a is designed ring-shaped. Groove 84a opens outwards in radial direction 122a. Groove 84a has a U-shaped axial sectional profile. Groove 84a has two axially opposite side walls 86a, 88a. In an installed state, engaging elements 34a, 36a, 38a are arranged at least substantially at a 180 degree angle in the axial direction between side walls 86a, 88a in relation to groove 84a.

Region 18a of the step has an extension in the circumferential direction that corresponds to an extension in the circumferential direction of fork bend 16a. Region 18a of the step has an extension in the circumferential direction that is at least 120 degrees. Region 18a of the step has an extension in the circumferential direction that is at least substantially 180 degrees. The first face of fork bend 16a has a first stepped edge. On an additional face that is facing away from the first face, fork bend 16a has an additional stepped edge. The first stepped edge and the additional stepped edge are arranged concentric to one another. The first stepped edge and additional stepped edge each have an extension in the circumferential direction that corresponds to an extension in the circumferential direction of fork bend 16a. The first stepped edge is designed concave-convex. The additional stepped edge is designed concave-convex.

The fork bend has at least one axial sectional profile that has at least two aligned, S-shaped contours 20a, 22a (see FIG. 4). The step has S-shaped contours 20a, 22a on the axial sectional profile. First contour 20a is arranged on the first face of fork bend 16a, additional contour 22a is arranged on the additional face of fork bend 16a. The S-shaped contours 20a, 22a have, in one contour in radial direction 122a, one first bend in each case and one second bend in each case. The first bend of first S-shaped contour 20a is aligned with the first bend of additional S-shaped contour 22a. The additional bend of first S-shaped contour 20a is aligned with additional bend of additional S-shaped contour 22a. S-shaped contours 20a, 22a are arranged at least substantially parallel to one another. S-shaped contours 20a, 22a are offset parallel to one another. In the present exemplary embodiment, fork bend 16a is designed press joined, at least in one region 18a of the step. S-shaped contours 20a, 22a are at least substantially only axially offset by 180 degrees in relation to one another. The bends of S-shaped contours 20a, 22a each have a radius of curvature that is smaller than half of the thickness of fork bend 16a in region 18a of the step. In the present exemplary embodiment, fork bend 16a has two radially aligned stepped surfaces 94a, 96a. A first stepped surface 94a is directed radially inwards. A normal vector of first stepped surface 94a is directed radially inwards. A second stepped surface 96a is directed radially outwards. A normal vector of second stepped surface 96a is directed radially outwards.

Fork bend 16a has a first section 98a that is arranged radially below the step. The fork bend 16a has additional section 100a that is arranged radially above the step. First section 98a is arranged in first bend plane 28a. Additional section 100a is arranged in additional bend plane 30a. Bend planes 28a, 30a are in each case arranged perpendicularly in relation to direction of displacement 70a. Bend planes 28a, 30a are axially offset in relation to one another. Additional bend plane 30a corresponds to the disk plane of fork bend 16a. The step forms a transition between sections 98a, 100a. The step is arranged radially between sections 98a, 100a. In an installed state, first section 98a engages at least partially in groove 84a of shift sleeve 12a.

FIG. 4 shows shift fork 10a and shift sleeve 12a in an initial switching state and in an additional switching state. In the additional switching state, shift fork 10a and shift sleeve 12a are in a position that is axially offset in relation to the position in the first switching state. Shift fork 10a is intended to move shift sleeve 12a along shifting path 102a in direction of displacement 70a. In the first switching state, shift sleeve 12a engages with toothed gear 104a of vehicle transmission 14a. In the additional switching state, shift sleeve 12a engages with additional toothed gear 106a of vehicle transmission 14a. On an outer circumference, first toothed gear 104a has ring 108a, which axially overlaps with shift sleeve 12a in the first switching state. Shift sleeve 12a axially engages partially in first toothed gear 104a in the first switching state. First section 98a of fork bend 16a engages partially in toothed gear 104a in the first switching state. An axial installation space can be advantageously used. Second section 100a of fork bend 16a overlaps in the axial direction with one of the side walls 86a of groove 84a of shift sleeve 12a. Sidewall 86a of groove 84a engages in fork bend 16a in the axial direction.

The thickness of fork bend 16a corresponds to maximum thickness 40a in region 18a of the step. The step comprises step height 42a, which is greater than 50% of maximum thickness 40a of fork bend 16a. Step height 42a corresponds at least substantially to 60% of maximum thickness 40a of fork bend 16a. Side walls 86a, 88a of groove 84a also each have one thickness. Step height 42a corresponds to the thickness of one of the sidewalls 86a of groove 84a. Fork bend 16a has a minimal thickness in region 18a of the step. The step has a radial extension that is smaller than double the minimum thickness of fork bend 16a in region 18a of the step.

Additional exemplary embodiments of the invention are shown in FIGS. 5 to 10. The following descriptions are substantially limited to the differences between the exemplary embodiments, wherein reference may be made to descriptions of the other exemplary embodiments, particularly those of FIGS. 1 to 4, in relation to components, features and functions that remain the same. To differentiate between exemplary embodiments, the letter a in the reference number of the exemplary embodiments in FIGS. 1 to 4 is replaced by the letters b to fin the reference numbers for the exemplary embodiments in FIGS. 5 to 10. Where components are designated the same, and in particular where components have the same reference number, references may in principle be made to drawings and/or descriptions of other exemplary embodiments, particularly those of FIGS. 1 to 4.

FIG. 5 shows an additional exemplary embodiment of a shift fork 10b for the actuation of a shift sleeve in a vehicle transmission using fork bend 16b, which at least partially surrounds the shift sleeve in an installed state. Consistent with the preceding exemplary embodiments, fork bend 16b surrounds the shift sleeve with reference to an outer circumference of the shift sleeve within an angle range of at least, substantially, 180 degrees. Fork bend 16b has inner circumference 54b, which faces the shift sleeve in an installed state. Fork bend 16b has an edge along inner circumference 54b, which engages in the shift sleeve in an installed state. Fork bend 16b is intended for moving the shift sleeve in direction of displacement 70b during a shift operation. Shift fork 10b has driver 74b which is intended to guide a shifting force for a shift operation into shift fork 10b. Shift fork 10b has guide tube 76b with axis 78b, which is arranged parallel to direction of displacement 70b.

Fork bend 16b has an axial step in one region 18b consistent with the preceding exemplary embodiment. Region 18b is designed in an arch shape. Region 18b is designed in the shape of a circular ring section. Region 18b at least partially surrounds the shift sleeve in an installed state. Region 18a at least substantially extends at an angle of 180 degrees along entire inner circumference 54b of fork bend 16b. Region 18b of the step has an extension in the circumferential direction that is at least 120 degrees. Region 18b of the step has an extension in the circumferential direction that is at least substantially 180 degrees. An extension of region 18b corresponds to an extension of fork bend 16b in the circumferential direction. Shift fork 10b has three engaging elements 34b, 36b, 38b that are intended to interact with the shift sleeve. Engaging elements 34b, 36b, 38b are arranged in region 18b of the step. Region 18b is arranged on inner circumference 54b of fork bend 16b.

The first face of fork bend 16b has a first stepped edge. On an additional face that is facing away from the first face, fork bend 16b has an additional stepped edge. The first stepped edge and the additional stepped edge are arranged as concentric to one another. The first stepped edge and additional stepped edge each have an extension in the circumferential direction that corresponds to an extension in the circumferential direction of fork bend 16b. The first stepped edge is designed concave-convex. The additional stepped edge is designed concave-convex.

Fork bend 16b has at least one axial sectional profile that has at least two aligned, S-shaped contours 20b, 22b (see FIG. 6). The step has S-shaped contours 20b, 22b on the axial sectional profile. First contour 20b is arranged on the first face of fork bend 16b. Additional contour 22b is arranged on the additional face of fork bend 16b. The S-shaped contours 20b, 22b each have, in one contour in radial direction 122a, one first bend and one second bend. The first bend of first S-shaped contour 20b is aligned with the first bend of additional S-shaped contour 22b. The additional bend of first S-shaped contour 20b is aligned with the additional bend of additional S-shaped contour 22b. S-shaped contours 20b, 22b are at least substantially arranged parallel to one another. S-shaped contours 20b, 22b are offset parallel to one another. In contrast to the preceding exemplary embodiment, fork bend 16b is designed elongated, at least in region 18b of the step. S-shaped contours 20b, 22b are offset axially and radially in relation to one another. The bends of S-shaped contours 20b, 22b each have a radius of curvature that at least substantially corresponds to 180 degrees of one half of a thickness of fork bend 16b in region 18b of the step.

Fork bend 16b has a first section 98b arranged radially below the step. Fork bend 16a has additional section 100b arranged radially above the step. First section 98b is arranged in first bend plane 28b. Additional section 100b is arranged in additional bend plane 30b. Bend planes 28b, 30b are in each case arranged perpendicularly in relation to direction of displacement 70b. Bend planes 28b, 30b are axially offset in relation to one another. Additional bend plane 30b corresponds to the disk plane of fork bend 16b. The step forms a transition between sections 98b, 100b. The step is arranged radially between sections 98b, 100b. In an installed state, first section 98b engages at least partially in the groove of the shift sleeve.

The thickness of fork bend 16b corresponds to maximum thickness 40b in region 18b of the step. The step comprises step height 42b, which is greater than 50% of maximum thickness 40b of fork bend 16b. Step height 42b corresponds at least substantially to 80% of maximum thickness 40b of fork bend 16b. The step has a radial extension that is smaller than double the minimum thickness of fork bend 16b in region 18b of the step.

FIG. 7 shows an additional exemplary embodiment for a shift fork 10c for actuation of a shift sleeve in a vehicle transmission using fork bend 16c, which at least partially surrounds the shift sleeve in an installed state. Fork bend 16c has an edge on an inner circumference that engages in the shift sleeve in an installed state. Fork bend 16c is intended for moving the shift sleeve in direction of displacement 70c during a shift operation. Fork bend 16c has an axial step in one region 18c in line with the preceding exemplary embodiment. Region 18c is designed in an arch shape.

Fork bend 16c has at least one axial sectional profile having at least two aligned, S-shaped contours 20c, 22c. The step has S-shaped contours 20c, 22c on the axial sectional profile. First contour 20c is arranged on the first face of fork bend 16c. Additional contour 22c is arranged on the additional face of fork bend 16c. S-shaped contours 20c, 22c each have a first bend and a second bend in a radial contour. The first bend of first S-shaped contour 20c is aligned with the first bend of additional S-shaped contour 22c. The additional bend of first S-shaped contour 20c is aligned with the additional bend of additional S-shaped contour 22c. S-shaped contours 20c, 22c are at least substantially arranged parallel to one another. S-shaped contours 20c, 22c are arranged offset parallel to one another. In contrast to the preceding exemplary embodiment, fork bend 16c is designed forged, at least in region 18c of the step. S-shaped contours 20c, 22c are offset axially and radially in relation to one another. The bends of S-shaped contours 20c, 22c each have a radius of curvature that is smaller than half of the thickness of fork bend 16c in region 18c of the step. Fork bend 16c has two stepped surfaces 94c, 96c. Stepped surfaces 94c, 96c are oriented offset parallel offset with one another. Stepped surfaces 94c, 96c are oriented obliquely relative to the disk plane of fork bend 16c.

Fork bend 16c has a first section 98c arranged radially below the step. Fork bend 16c has additional section 100c radially arranged above the step. First section 98c is arranged in first bend plane 28c. Additional section 100c is arranged in additional plane 30c. Bend planes 28c, 30c are in each case arranged perpendicularly in relation to direction of displacement 70c. Bend planes 28c, 30c are arranged axially offset in relation to one another. Additional bend plane 30c corresponds to the disk plane of fork bend 16c. The step forms a transition between sections 98c, 100c. The step is arranged radially between sections 98c, 100c. In an installed state, first section 98c engages at least partially in a groove of the shift sleeve.

The thickness of fork bend 16c corresponds to maximum thickness 40c in region 18c of the step. The step comprises step height 42c, which is greater than 50% of maximum thickness 40c of fork bend 16c. Step height 42c corresponds at least substantially to 80% of maximum thickness 40c of fork bend 16c. Fork bend 16c has a minimal thickness in region 18c of the step. The step has a radial extension that is smaller than double a minimum thickness of fork bend 16c in region 18c of the step.

FIG. 8 shows an additional exemplary embodiment of a shift fork 10d for the actuation of a shift sleeve in a vehicle transmission using fork bend 16d, which at least partially surrounds the shift sleeve in an installed state. Fork bend 16d has an edge along an inner circumference that engages in the shift sleeve in an installed state. Fork bend 16d is intended for moving the shift sleeve in direction of displacement 70d during a shift operation. Fork bend 16d has an axial step in one region 18d in line with the preceding exemplary embodiment. Region 18d is designed in an arch shape.

Fork bend 16d has at least one axial sectional profile having at least two aligned, S-shaped contours 20d, 22d. The step has S-shaped contours 20d, 22d on the axial sectional profile. First contour 20d is arranged on the first face of fork bend 16d and additional contour 22d is arranged on the additional face of fork bend 16d. First S-shaped contour 20d is designed aligned with additional S-shaped contour 20d. S-shaped contours 20d, 22d are arranged at least substantially parallel to one another. S-shaped contours 20d, 22d are arranged offset parallel to one another. In contrast to the preceding exemplary embodiments, fork bend 16d is designed in two pieces. Fork bend 16d has basic body 110d and an engaging bend 112d, which are rigidly connected together. Basic body 110d and engaging bend 112d are integrally connected in the present exemplary embodiment. It is conceivable for basic body 110d and engaging bend 112d to have another secure connection that is deemed suitable by a person skilled in the art, for example, using connection elements such as pins or the like. Basic body 110d and engaging bend 112d are arranged radially overlapping in region 18d. S-formed contours 20d, 22d are axially and radially offset in relation to one another. In the present exemplary embodiment, fork bend 16d has two radially aligned stepped surfaces 94d, 96d. The first of the stepped surfaces 94d is directed radially inwards. A normal vector of first stepped surface 94d is directed radially inwards. A second stepped surface 96d is directed radially outwards. A normal vector of second stepped surface 96d is directed radially outwards.

Fork bend 16d has a first section 98d arranged radially below the step. Engaging bend 112d forms the first section 98d. Fork bend 16d has additional section 100d arranged radially above the step. Basic body 110d forms additional section 100d. First section 98d is arranged in first bend plane 28d. Engaging bend 112d is arranged in first bend plane 28d. Additional section 100d is arranged in additional plane 30d. Bend planes 28d, 30d are each arranged perpendicularly in relation to direction of displacement 70d. Bend planes 28d, 30d are axially offset in relation to one another. The step forms a transition between sections 98d, 100d. The step is radially arranged between sections 98d, 100d. In an installed state, first section 98d engages at least partially in a groove of the shift sleeve.

Basic body 110d has thickness 40d in region 18d. Engaging bend 112d has a thickness in region 18d. In the present exemplary embodiment, the step has stepped height 42d corresponding to the thickness of engaging bend 112d. The step has a radial extension that is smaller than double the minimum thickness of fork bend 16d in region 18d of the step.

FIG. 9 shows an additional exemplary embodiment for a shift fork 10e for the actuation of a shift sleeve in a vehicle transmission with fork bend 16e, which at least partially surrounds the shift sleeve in an installed state. Fork bend 16e has an edge along an inner circumference which engages in the shift sleeve in an installed state. Fork bend 16e is intended for moving the shift sleeve in direction of displacement 70e during a shift operation. Fork bend 16e has an axial step in one region 18e. In contrast to the preceding exemplary embodiments, fork bend 16e has an axial step in an additional region 44e. The steps are arranged in an identical axial direction. The steps are arranged radially offset in relation to one another. The steps are arranged concentrically in relation to one another. Regions 18e, 44e are concentrically arranged in relation to one another. Regions 18e, 44e are designed in an arch shape in each case.

Fork bend 16e has at least one axial sectional profile that has four aligned, S-shaped contours 20e, 22e, 24e, 26e. First contour 20e and an additional contour 24e are arranged on a first face of fork bend 16e. Third contour 22e and fourth contour 26e are arranged on an additional face of fork bend 16e. S-shaped contours 20e, 22e, 24e, 26e are aligned in relation to one another. S-shaped contours 20e, 22e, 24e, 26e are at least substantially arranged parallel to one another. S-shaped contours 20e, 22e, 24e, 26e are offset parallel to one another. In the present exemplary embodiment, fork bend 16e has four radially aligned stepped surfaces 94e, 96e, 116e, 118e. First stepped surface 94e and second stepped surface 116e are directed radially inwards. Third stepped surface 96e and fourth stepped surface 118e are directed radially outwards.

Fork bend 16c has a first section 98e arranged radially below a first of the steps. Fork bend 16e has an additional section 100e arranged radially between the first step and an additional step. In contrast to the preceding examples, fork bend 16e has a third section 114e radially arranged above the additional step. First section 98e is arranged in first bend plane 28e. Additional section 100e is arranged in additional plane 30e. Third section 114e is arranged in a third bend plane 32e. Bend planes 28e, 30e, 32e are in each case arranged perpendicularly in relation to direction of displacement 70e. Bend planes 28e, 30e, 32e are arranged axially offset in relation to one another. Third bend plane 32e is offset in the same direction relative to second bend plane 30e, as second bend plane 30e relative to first bend plane 28e. The steps in each case form a transition between sections 98e, 100e, 114e. The steps are in each case arranged radially between two sections 98e, 100e, 114e. In an installed state, first section 98e engages at least partially in the groove of the shift sleeve. The first step has step height 42e. The second step has step height 120e. In the present exemplary embodiment, the steps have identical step heights 42e, 120e. It is conceivable for the steps to have differing heights as part of an alternative embodiment.

FIG. 9 shows an additional exemplary embodiment of a shift fork 10f for the actuation of a shift sleeve in a vehicle transmission using fork bend 16f, which at least partially surrounds the shift sleeve in an installed state. Fork bend 16f has an edge along an inner circumference that engages in the shift sleeve in an installed state. Fork bend 16f is intended for moving the shift sleeve in direction of displacement 70f during a shift operation. Fork bend 16f has an axial step in one region 18f. Fork bend 16f has an additional axial step in an additional region 44f. The steps are in opposing axial directions. The steps are arranged radially offset in relation to one another. The steps are arranged concentrically in relation to one another. Regions 18f, 44f are concentrically arranged in relation to one another. Regions 18f, 44f are designed in an arch shape in each case.

Fork bend 16f has at least one axial sectional profile that has four paired and aligned, S-shaped contours 20f, 22f, 24f, 26f. A first pair of S-shaped contours 20f, 22f is allocated to the first step. A second pair of S-shaped contours 24f, 26f is allocated to the second step. S-shaped contours 20f, 22f, 24f, 26f of the different pairs are arranged opposite one another. S-shaped contours 20f, 22f of the first pair are arranged at least substantially parallel to one another. S-shaped contours 24f, 26f of the second pair are arranged at least substantially parallel to one another. Fork bend 16f has four radially aligned stepped surfaces 94f, 96f, 116f, 118f in the present exemplary embodiment. First stepped surface 94f and second stepped surface 116f are directed radially inwards. Third stepped surface 96f and fourth stepped surface 118f are directed radially outwards.

Fork bend 16f has a first section 98f arranged radially below the first of the steps. Fork bend 16f has an additional section 100f radially arranged between the first step and an additional step. In contrast to the preceding examples, fork bend 16f has a third section 114f arranged radially above the additional step. First section 98f is arranged in first bend plane 28f. Additional section 100f is arranged in additional plane 30f. Third section 114f is arranged in a third bend plane 32f. Bend planes 28f, 30f, 32f are in each case arranged perpendicularly in relation to direction of displacement 70f. Bend planes 28f, 30f, 32f are axially offset in relation to one another. Third bend plane 32f is offset in the same direction relative to second bend plane 30f, as second bend plane 30f relative to first bend plane 28f. The steps in each case form a transition between sections 98f, 100f, 114f. The steps are in each case arranged radially between two sections 98f, 100f, 114f. In an installed state, first section 98f engages at least partially in the groove of the shift sleeve.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMBER LIST

10 Shift fork
12 Shift sleeve
14 Vehicle transmission
16 Fork bend
18 Region
20 Contour
22 Contour
24 Contour
26 Contour
28 Bend plane
30 Bend plane
32 Bend plane
34 Engaging element
36 Engaging element
38 Engaging element
40 Thickness
42 Step height
44 Region
48 Power train
50 Internal combustion engine
52 Drive shaft
54 Inner circumference
56 Coupling device
58 Differential transmission
60 Drive gear
62 Drive gear
64 Drive shafts
66 Drive shafts
68 Control and/or regulation unit
70 Direction of displacement
72 Axis of rotation
74 Driver
76 Guide tube
78 Axis
80 Guide rod
82 Guide sleeve
84 Groove
86 Sidewall
88 Sidewall
90 Supporting element
92 Supporting element
94 Step surface
96 Step surface
98 Section
100 Section
102 Shift path
104 Toothed gear
106 Toothed gear
108 Ring
110 Basic body
112 Engaging bend
114 Section
116 Step surface
118 Step surface
120 Step height
122 Radial direction

The invention claimed is:

1. A vehicle transmission, comprising:
a toothed gear;
a shift sleeve having a rotational axis and being separately formed and axially displaceable in relation to the toothed gear;
a shift fork configured to actuate the shift sleeve; and
a fork bend partially surrounding the shift sleeve in an installed state,
wherein an axis of the fork bend coincides with the rotational axis of the shift sleeve,
wherein the fork bend has an axial step
having a shape of a circular ring section substantially extending at an angle of 180 degrees in a circumferential direction relative to the axis of the fork bend,
wherein the axial step has first and second radially adjacent sections arranged axially offset in relation to one another relative to the axis of the fork bend,
wherein, relative to the axis of the fork bend, the first section is arranged radially inward from the axial step and the second section is arranged radially outward from the axial step,
wherein, in an initial switching state and relative to the axis of the fork bend
a portion of the toothed gear is arranged further radially outward than the first section and the first section is partially axially overlapped by the portion of the toothed gear, and
the second section is arranged further radially outward than one side wall of a groove in the shift sleeve and the second section axially overlaps the one side wall of a groove in the shift sleeve,
wherein, in the initial switching state, the shift sleeve engages the toothed gear and the first section partially engages in the toothed gear,
wherein, in an additional switching state, the shift sleeve engages an additional toothed gear,
wherein the toothed gear and the additional toothed gear are arranged on opposite sides of the shift sleeve.

2. The vehicle transmission of claim 1, wherein the fork bend has at least one axial sectional profile having at least two S-shaped contours that are arranged at least substantially parallel to one another.

3. The vehicle transmission of claim 2, wherein at least one engaging element is arranged in a one region having the axial step and is configured to interact with the shift sleeve.

4. The vehicle transmission of claim 2, wherein the fork bend has an axial maximum thickness in a one region having the axial step and the axial step has an axial step height that is 50% greater than the axial maximum thickness in the region having the axial step.

5. The vehicle transmission of claim 2, wherein the fork bend has at least one additional axial step.

6. The vehicle transmission of claim 2, wherein the one side wall of the groove in the shift sleeve is opposite of another side wall of the groove in the shift sleeve.

7. A vehicle transmission, comprising:
a toothed gear;

a shift sleeve having a rotational axis and being separately formed and axially displaceable in relation to the toothed gear;

a shift fork configured to actuate the shift sleeve; and a fork bend partially surrounding the shift sleeve in an installed state, wherein an axis of the fork bend coincides with the rotational axis of the shift sleeve, wherein the fork bend has an axial step having a shape of a circular ring section substantially extending at an angle of 180 degrees in a circumferential direction relative to the axis of the fork bend, wherein the axial step has first and second radially adjacent sections arranged axially offset in relation to one another relative to the axis of the fork bend, wherein, relative to the axis of the fork bend, the first section is arranged radially inward from the axial step and the second section is arranged radially outward from the axial step, wherein, in an initial switching state and relative to the axis of the fork bend a portion of the toothed gear is arranged further radially outward than the first section and the first section is partially axially overlapped by the portion of the toothed gear, and the second section is arranged further radially outward than one side wall of a groove in the shift sleeve and the second section axially overlaps the one side wall of a groove in the shift sleeve, wherein the fork bend has at least two bend planes that are each arranged perpendicular in relation to a direction of displacement of the fork bend and axially offset in relation to one another, wherein a first of the at least two bend planes passes through the first section of the fork bend but not the second section of the fork bend and a second of the at least two bend planes passes through the second section of the fork bend but not the first section of the fork bend, and wherein, in the initial switching state, the shift sleeve engages the toothed gear and the first section partially engages in the toothed gear, wherein, in an additional switching state, the shift sleeve engages an additional toothed gear, and wherein the toothed gear and the additional toothed gear are arranged on opposite sides of the shift sleeve.

8. The vehicle transmission of claim 7, wherein at least one engaging element is arranged in a region having the axial step and is configured to interact with the shift sleeve.

9. The vehicle transmission of claim 7, wherein the fork bend has an axial maximum thickness in a region having the axial step and the axial step has an axial step height that is 50% greater than the axial maximum thickness in the region having the axial step.

10. The vehicle transmission of claim 7, wherein the fork bend has at least one additional axial step.

11. The vehicle transmission of claim 7, wherein the one side wall of the groove in the shift sleeve is opposite of another side wall of the groove in the shift sleeve.

* * * * *